(12) United States Patent
Shah et al.

(10) Patent No.: US 11,973,738 B2
(45) Date of Patent: *Apr. 30, 2024

(54) DOMAIN NAME SYSTEM ANALYSIS ON EDGE NETWORK DEVICES

(71) Applicant: Arista Networks, Inc., Santa Clara, CA (US)

(72) Inventors: Sandip K. Shah, Fremont, CA (US); Robert Ling, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,475

(22) Filed: Mar. 14, 2023

(65) Prior Publication Data

US 2023/0379295 A1 Nov. 23, 2023

Related U.S. Application Data

(63) Continuation of application No. 17/747,244, filed on May 18, 2022, now Pat. No. 11,637,807.

(51) Int. Cl.
| | |
|---|---|
| *H04L 29/08* | (2006.01) |
| *G06F 16/28* | (2019.01) |
| *H04L 41/22* | (2022.01) |
| *H04L 43/04* | (2022.01) |
| *H04L 43/12* | (2022.01) |
| *H04L 61/4511* | (2022.01) |

(52) U.S. Cl.
CPC ........ *H04L 61/4511* (2022.05); *G06F 16/285* (2019.01); *H04L 43/04* (2013.01); *H04L 43/12* (2013.01)

(58) Field of Classification Search
CPC ..... H04L 61/4511; H04L 43/04; H04L 43/12; H04L 29/08; H04L 41/22; G06F 16/285
USPC .......................................................... 709/224
See application file for complete search history.

(56) References Cited

U.S. PATENT DOCUMENTS

| | | | |
|---|---|---|---|
| 9,577,898 B1 * | 2/2017 | Baldi | H04L 43/062 |
| 11,637,807 B1 * | 4/2023 | Shah | G06F 16/285 |
| | | | 709/224 |
| 2002/0105911 A1 * | 8/2002 | Pruthi | H04L 41/5003 |
| | | | 370/474 |

(Continued)

*Primary Examiner* — Jude Jean Gilles
(74) *Attorney, Agent, or Firm* — SPRINKLE IP LAW GROUP

(57) ABSTRACT

A method for analyzing a pair of domain name system (DNS) packets, the method comprising: extracting a portion of a request DNS packet to obtain extracted request DNS information, wherein the extracted request DNS information comprises a first timestamp generated by the edge network device, obtaining a response DNS packet, extracting at least a portion of the response DNS packet to obtain extracted response DNS information, wherein the extracted response DNS information comprises a second timestamp generated by the edge network device, after the obtaining, processing the extracted request DNS information and extracted response DNS information to obtain processed information, wherein the processed information comprises a roundtrip time derived from the first timestamp and the second timestamp, and transmitting the processed information to a monitoring system, wherein the pair of DNS packets are not transmitted to the monitoring system.

20 Claims, 3 Drawing Sheets

(56) References Cited

U.S. PATENT DOCUMENTS

| | | | |
|---|---|---|---|
| 2002/0126663 A1* | 9/2002 | Katzman | H04L 9/40 370/389 |
| 2003/0152078 A1* | 8/2003 | Henderson | H04L 69/161 370/389 |
| 2003/0154328 A1* | 8/2003 | Henderson | H04L 47/568 710/1 |
| 2005/0055435 A1* | 3/2005 | Gbadegesin | H04L 67/1008 709/224 |
| 2008/0010653 A1* | 1/2008 | Ollikainen | H04N 21/8358 348/E7.071 |
| 2010/0290468 A1* | 11/2010 | Lynam | H04L 67/14 370/392 |
| 2020/0244758 A1* | 7/2020 | Enguehard | H04N 21/222 |

* cited by examiner

DOMAIN NAME SYSTEM ANALYSIS ON EDGE NETWORK DEVICES

CROSS-REFERENCE TO RELATED APPLICATION(S)

This application is a continuation of, and claims a benefit of priority under 35 U.S.C. 120 from, U.S. patent application Ser. No. 17/747,244, filed May 18, 2022, issued as U.S. Pat. No. 11,637,807, entitled "DOMAIN NAME SYSTEM ANALYSIS ON EDGE NETWORK DEVICES," which is fully incorporated by reference herein for all purposes.

BACKGROUND

In some implementations of a network, a monitoring system operating in the network may include functionality to obtain mirrored packets from network devices in the network. The mirrored packets may be used by the monitoring system for analysis of the network traffic in the network.

DETAILED DESCRIPTION

Figure 1:
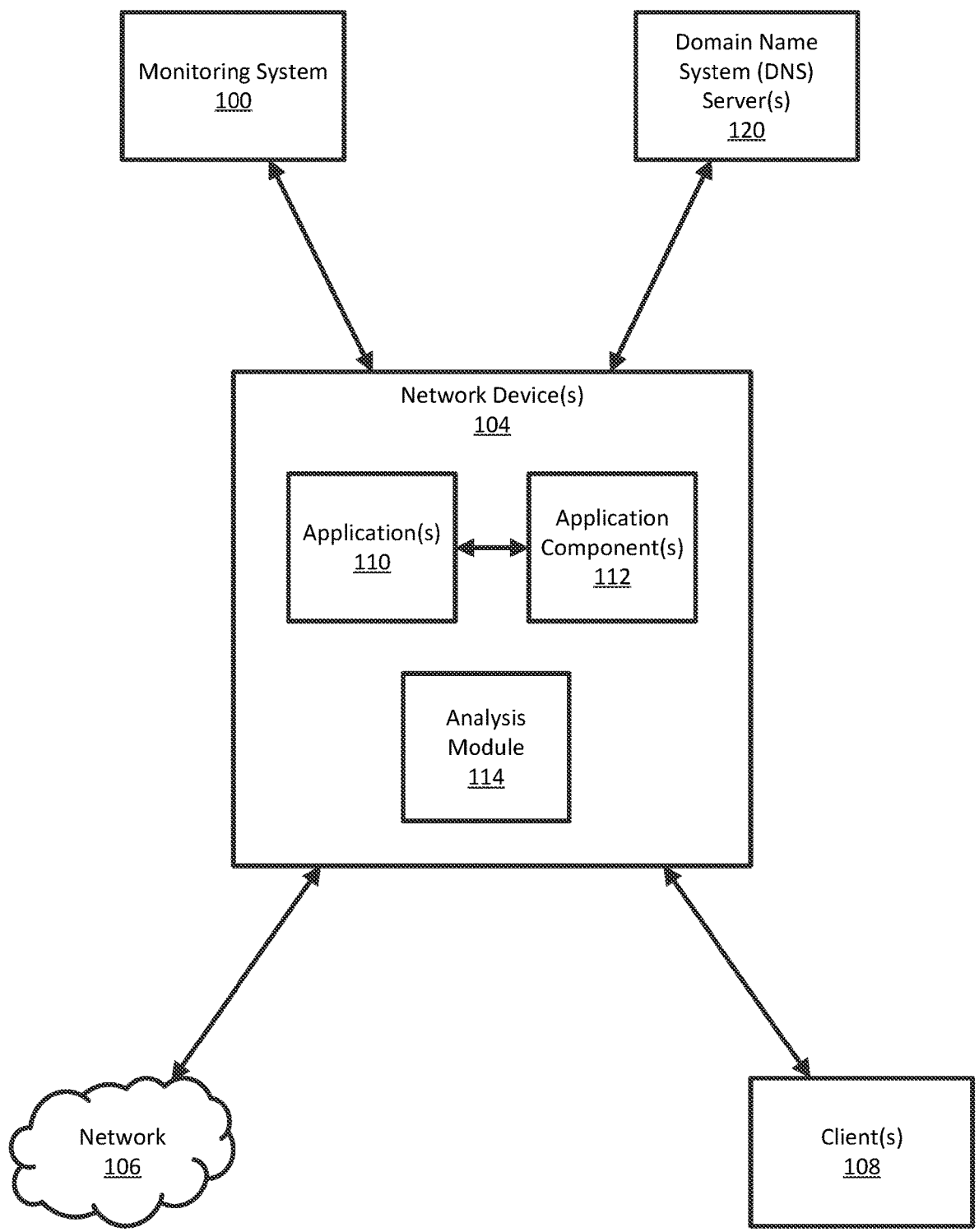
FIG. 1 shows a diagram of a system, in accordance with one or more embodiments.

During operation of a network, a monitoring system operating in the network may include functionality to obtain mirrored packets from network devices in the network. The mirrored packets may be used by the monitoring system for analysis of the network traffic in the network. The monitoring system may be a separate entity from the network devices providing the mirrored packets.

The mirrored packets may be provided by network devices (i.e., the network devices that are being monitored by the monitoring system) in response to one or more requests by the monitoring system. As part of the process of obtaining the mirrored packets by the monitoring system, the monitoring system applies a timestamp to the mirrored packets, which is different from the time the packets are originally received by the network device because the obtained mirrored packets traverse a path between the network device providing the mirrored packets and a component of the monitoring system that applies the timestamp. Traversing the path may result in a significant latency between the network device and the monitoring system. For example, the path may include any number of additional software, hardware components, and/or queues. Because of the potentially significant latency caused by traversing the path to the monitoring system, the timestamp applied to the mirrored packets may not be accurate (i.e., it may not reflect when the packet was actually received by the network device). Thus, any analysis that utilizes the timestamps generated by the monitoring system may not be reliable. For example, the timestamps associated with the mirrored packets are not accurate. As such, any analysis that requires the mirrored packets to be ordered based on the timestamps will also not be accurate. In another example, if the analysis requires identification of mirrored packets that were received after a particular point in time, any inaccuracy in the timestamps associated with the mirrored packets may result in the incorrect mirrored packets being identified. This incorrect identification may then result in subsequent errors in any analysis that is based on this incorrect identification.

Further, current monitoring systems do not receive all mirrored packets associated with a pair of packets (e.g., a request packet and a response packet). Specifically, because of the logistical difficulty in collecting all mirrored packets from all edge network devices in a network, the monitoring system may instead collect samples of packets from the edge network devices, which includes only a fraction of all packets transmitted across the network. Packet analysis on this subset of packets may not be as accurate as an analysis performed on all packets, or an analysis that is at least somewhat based on all packets.

It would be beneficial to provide improved monitoring tools to a system on which a Domain Name System (DNS) operates. Specifically, a network device that communicates with a DNS server to obtain information for accessing additional entities (e.g., web servers) in a network may send request DNS packets and obtain response DNS packets. The request DNS packets and the response DNS packets may be collectively referred to as a pair of DNS packets. In such scenarios, if both packets in the pair of DNS packets are not mirrored and provided to the monitoring system, the monitoring system cannot properly analyze the DNS traffic associated with the pair of DNS packets. Consequently, the monitoring system may not have the appropriate information to identify issues regarding the DNS traffic. As such, this may reduce the likelihood of said issues being resolved by the monitoring system.

For example, for a pair of DNS packets including a request and response DNS packet, the analysis may include determining a response time. The response time cannot be determined if the monitoring system does not obtain both the request and response packets.

Embodiments disclosed herein disclose methods and systems for performing a processing of mirrored packets at edge network devices and providing processed information associated with the mirrored packets to the monitoring system. Embodiments disclosed herein include utilizing an analysis module on an edge network device that performs the transmission of packets to the Domain Name System (DNS) server. The analysis module may extract all or a portion of each packet (referred to as extracted content), store a timestamp for the packet, process the extracted content to generate processed information, and transmit the processed information to the monitoring system. The timestamp may be applied by the analysis module (e.g., executing on a processor of the network device) or at the hardware level (e.g., by a forwarding component of the network device external to the processor).

In one or more embodiments, the mirrored packets may be mirrored DNS packets. The DNS packets may include a request DNS packet and a response DNS packet. The packets may be associated with each other using, for example, a transaction identifier (ID) of the pair of DNS packets. The request DNS packets may be packets that specify requesting access to a network device using a domain name. A DNS server may obtain the request DNS packets and determine an address (e.g., an internet protocol (IP) address) associated with the requested domain name. A response DNS packet may be transmitted by the DNS server to the edge network device that specifies the requested address. The pair of request and response DNS packets may be processed as discussed above by the same edge network device to obtain processed information. The processed information is subsequently transmitted to the monitoring system.

While embodiments disclosed herein describe using a pair of DNS packets, packets generated via any other protocols may be processed by the edge network devices and transmitted to the monitoring system without departing from this disclosure.

In one or more embodiments, the monitoring system, in response to obtaining the processed information, performs additional processing (also referred to as "secondary processing") on the processed information. The monitoring system may obtain processed information from multiple packets. The secondary processing may be performed using aggregated processed information of multiple packets from multiple edge network devices. The secondary processing may include, for example, applying a machine learning algorithm to the aggregated processed information.

The following discussion describes various embodiments of the disclosure.

FIG. 1 shows a diagram of a system, in accordance with one or more embodiments. The system may include a monitoring system (100) one or more network device(s) (104), a network (106), one or more DNS servers (120) and one or more client(s) (108). The system may include additional, fewer, and/or different components without departing from the technology. Each of these components is described below.

In one or more embodiments, the one or more network device(s) (104) are physical devices that include persistent storage, memory (e.g., random access memory), one or more processor(s) (including a switch chip), and two or more physical ports. In one or more embodiments disclosed herein, the switch chip is hardware that determines which egress port on a network device to forward media access control (MAC) frames. The switch chip may include egress and ingress ports that may connect to ports on the network device. Each port may or may not be connected to another device on a network device on the network (106) (e.g., a server, a switch, a router, etc.). The network device may be configured to receive packets via the ports and determine whether to: (i) drop the packet; (ii) process the packet in accordance with one or more embodiments disclosed herein; and/or (iii) send the packet, based on the processing, out another port on the network device.

How the network device makes the determination of whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (e.g., which was written by the last device to send the packet) in the L2 information encapsulating the packet. If the network device is a multilayer switch, the multilayer switch includes functionality to process packets using both MAC addresses and IP addresses.

Examples of network devices include, but are not limited to, a router, a switch, and a multilayer switch. The network device is not limited to the aforementioned specific examples.

In one or more embodiments, an application (e.g., application(s) (110), "application software") is software that includes instructions which, when executed by a processor of a network device (104), initiates the performance of one or more specific operations of the network device (104). In one or more embodiments, software is a collection of computer instructions (e.g., computer code) which, when executed by the processor(s) of the computing device, cause the computing device to perform one or more processes specified in the computer instructions. Non-limiting examples of an application (110) that may execute on a network device (104) include database management, a web service, a monitoring system (100), and/or any other network related software.

In one or more embodiments, an application component (e.g., application components(s) (112)) is software and/or data that is used by one or more application(s) (110). Application components may include services, data, and/or other sub-applications utilized by the application to perform the operation of the application. Non-limiting examples of application components include a database, an application programming interface (API), a user interface, an analytics engine, etc.

In one or more embodiments, one or more of the network devices (104) are edge network devices. In one or more embodiments, edge network devices include functionality for providing communication between the clients (108) and other entities (e.g., other network devices, clients, and/or computing devices) in the network (106). The edge network devices may be associated with a network connection that is more direct to the clients (108) than the other entities in the network.

In one or more embodiments, the DNS servers (120) include functionality for obtaining one or more queries from a client (e.g., one of the clients (108)) and/or a network device (e.g., an edge network device) that request accessing a service (e.g., a web service) by translating domain names to the respective addresses corresponding to the requested service. The DNS server (120) may obtain request DNS packets from the edge network device that include one or more queries. The DNS server (120) may service the queries and provide a response DNS packet to the edge network device that specifies the result of the servicing. An example of such communication between the DNS server (120) and an edge network device (104) is further described, e.g., in FIG. 3.

In one or more embodiments, the analysis module (114) is software executing on a control plane of the network device (104) that includes functionality for obtaining and processing pairs of packets. In one or more embodiments, the pair of packets include a request DNS packet and a response DNS packet. The analysis module (114) may obtain and/or process other pairs of packets without departing from the technology. The pair of packets may be processed, e.g., in accordance with FIG. 2. The result of the processing may be processed information. The processed information may be provided to the monitoring system (100).

In one or more embodiments disclosed herein, the functionality of the network device may be logically divided into a control plane and data plane (not shown). The data plane includes functionality to receive packets via ports of the network device (104), process the packets and, as appropriate, transmit packets via the ports towards a destination.

In one or more embodiments, the control plane includes functionality to manage the overall operation of the network device. More specifically, the control plane includes functionality to manage the operation of the data plane. The control plane may also include functionality to generate and send processed information to the monitoring system (100).

In one or more embodiments, the analysis module (114) (e.g., implemented in the control plane) is included in such network devices (e.g., 104) that are edge network devices. Specifically, because an edge network device may be equipped to obtain both packets in a pair of packets, the edge network device may include functionality for processing the pair of packets. As such, the edge network devices include the analysis module (114) to execute such processing.

While embodiments disclosed herein discuss the pairs of packets that are read using a DNS protocol, other pairs of packets may be processed by the analysis module (114) without departing from this disclosure. For example, the pair of packets may include other data that is read using other protocols without departing from this disclosure. Examples of other protocols include, but are not limited to: transmission control protocol (TCP), user datagram protocol (UDP), and transport layer security (TLS).

In one or more embodiments, the monitoring system (100) is software executing on a computing device (not shown) that includes functionality for obtaining information from the network devices (104) and performing services based on the obtained information. The obtained information may include, for example, processed information generated by the network device (104).

In one or more embodiments, the monitoring system (100) includes functionality for obtaining aggregate processed information from multiple network devices (e.g., network devices (104)). The aggregate processed information may be used to provide reports associated with the operation of the network (106). The reports may be provided to an administrator of the network (106).

In one or more embodiments, a client (e.g., client(s) (108)) is a computing device operatively connected to one or more network device(s) (104). Non-limiting examples of a client (108) include a server (e.g., a blade-server in a blade-server chassis, a rack server in a rack, etc.) or a personal computer (e.g., desktop, laptop, tablet, smart phone, personal digital assistant), and/or any other type of computing device that may utilize one or more network device(s).

In one or more embodiments, the network (106) is a network to which the network device (104) is operatively connected. In one or more embodiments, the network (106) is a collection of connected network devices (104, others not shown) that allows for the communication of data from one network device to other computing device(s) (not shown), or the sharing of resources among network devices. Non-limiting examples of a network include a local area network (LAN), a wide area network (WAN) (e.g., the Internet), a mobile network, or any other type of network that allows for the communication of data and sharing of resources among network devices and/or computing devices operatively connected to the network. One of ordinary skill in the art, having the benefit of this detailed description, would appreciate that a network is a collection of operatively connected computing devices that enables communication between those devices.

While FIG. 1 shows a specific configuration of a system, other configurations may be used without departing from the scope. Accordingly, embodiments disclosed herein should not be limited to the configuration of devices and/or components shown in FIG. 1.

Figure 2:
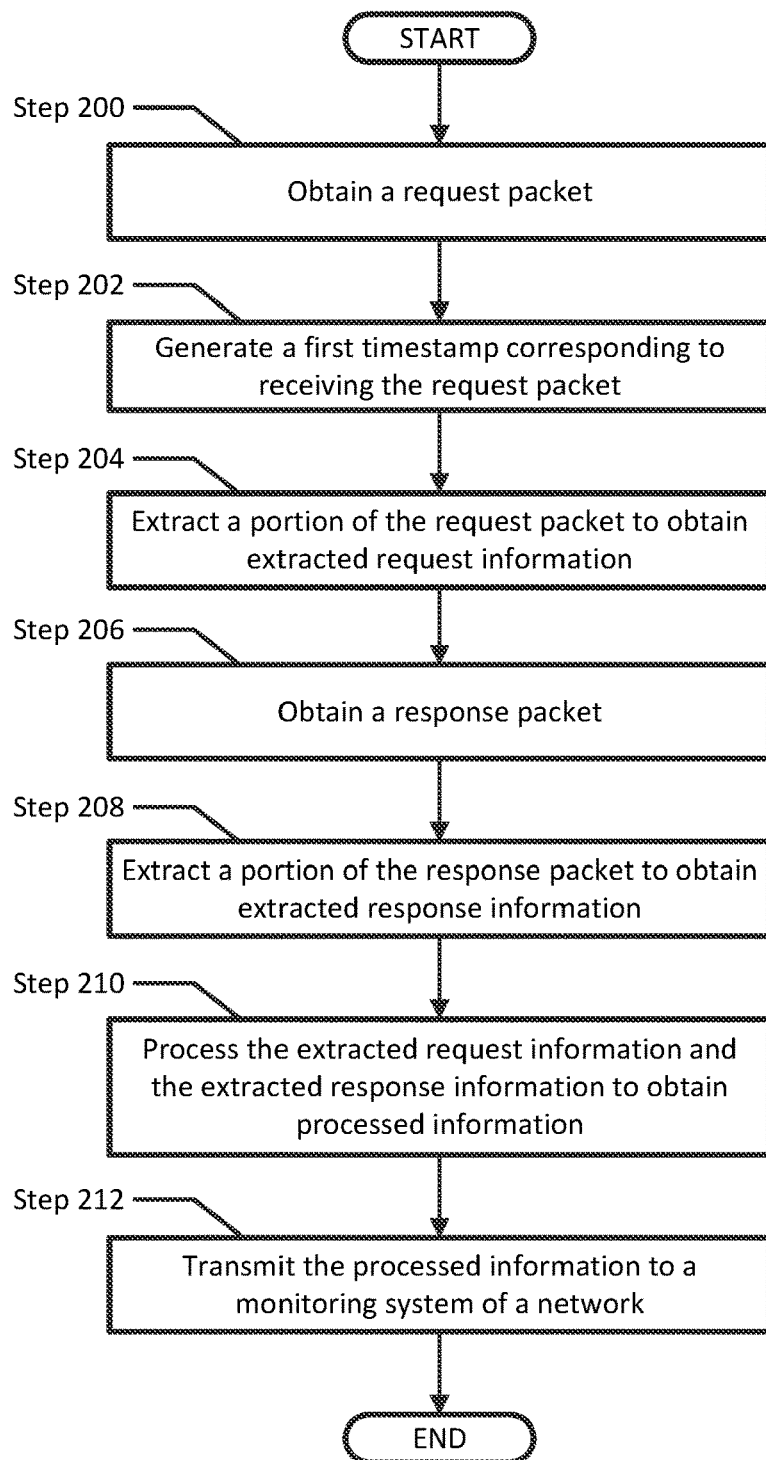
FIG. 2 shows a flowchart of a method of processing a pair of packets in accordance with one or more embodiments.

FIG. 2 shows a flowchart of a method of processing a pair of packets in accordance with one or more embodiments. All or a portion of the method shown in FIG. 2 may be performed by the analysis module of an edge network device. However, another component of the system of FIG. 1 may perform this method without departing from one or more embodiments. While the various steps in this flowchart are presented and described sequentially, one of ordinary skill in the relevant art will appreciate that some or all of the steps may be executed in different orders, may be combined or omitted, and some or all steps may be executed in parallel.

In step 200, a request packet is obtained. The request packet may be obtained from a second network device. In one or more embodiments, the request packet is a request DNS packet. The request DNS packet may include one or more queries related to obtaining information using a DNS protocol. For example, one or more of the queries may include a domain name and a request to access a web server related to the domain name.

In one or more embodiments, the request packet is obtained by mirroring (e.g., generating a replica of) an original request packet from a data plane of the network device. The data plane of the network device may generate the replica and provide the replica to the analysis module. In one or more embodiments, the original request packet is obtained from a client by the data plane. In contrast, the analysis module may operate in a control plane of the network device. In such embodiments, the data plane may copy the contents of the original request packet to generate the replica, and provide the replica (hereinafter "the replicated request packet) to the analysis module. Alternatively, the data plane may provide the original request packet to the analysis module. The analysis module may then generate the replica by copying the contents of the original request packet, and return the original request packet to the data plane for processing. In this manner, the original request packet may be serviced in accordance with traditional networking protocols, and the replicated request packet is processed in accordance with steps 202-212. In such embodiments, the "request packet" discussed hereafter refers to the replicated request packet.

In step 202, a first timestamp corresponding to the request packet is generated. In one or more embodiments, the first timestamp is generated based on one of the following points in time: (i) the point in time in which the original request packet is obtained from the second network device by the data plane, or (ii) the point in time in which the replicated request packet is obtained from the data plane by the analysis module. The first timestamp may be generated by the data plane during the mirroring discussed in step 200 and provided to the analysis module. In such embodiments, the first timestamp is associated with the first (i) point in time. Alternatively, the first timestamp is generated by the analysis module after obtaining the replicated request packet. In such embodiments, the first timestamp is associated with the second (ii) point in time. The first timestamp may be included in the request packet.

In step 204, a portion of the request packet is extracted to obtain extracted request information. In one or more embodiments, the extracted request information includes an address of the client (e.g., an internet protocol (IP) source address), a list of the queries in the request packet, and a type for each of the queries.

In one or more embodiments, if the request packet is a request DNS packet, examples of the type of queries include, but are not limited to: an address record, an authoritative name server, a mail exchange record, a canonical name (CNAME) record, a start of a zone of authority record, host information, and a certificate record. The extracted request information may further include a type of DNS resolver (e.g., recursive, non-recursive, or iterative) used to generate the request DNS packet. The analysis module determines the portion of the request packet to extract based on a configuration of the analysis module performed by, for example, an administrator of the edge network device.

In one or more embodiments, prior to proceeding with the method of FIG. 2, the original request packet (i.e., the second request packet discussed above) is transmitted to another network device. In such embodiments in which the request packet is a request DNS packet, the other network device includes a DNS server. The DNS server may process the request DNS packet in accordance with the DNS protocol. Such protocol may include, for example, processing the queries in the request DNS packet, generating one or more results to the queries, and transmitting the results as a response DNS packet to the edge network device.

In step 206, a response packet is obtained. In one or more embodiments, the response packet is obtained from the second network device discussed above (e.g., in steps 200-204). Alternatively, the response packet may be obtained from a third network device.

Similar to the request packet, the response packet may be a replica of an original response packet originally obtained by the data plane. The data plane may generate the replica of the second response packet and provide the replica to the analysis module. In such embodiments, the data plane may copy the contents of the original response packet to generate the replica, and provide the replica (hereinafter "the replicated response packet) to the analysis module. Alternatively, the data plane may provide the original response packet to the analysis module. The analysis module may then generate the replica by copying the contents of the original response packet, and return the original response packet to the data plane for processing. In this manner, the original response packet may be serviced in accordance with traditional networking protocols, and the replicated response packet is processed in accordance with steps 208-212. In such embodiments, the "response packet" discussed hereafter refers to the replicated response packet.

Further, similar to the request packet, a second timestamp may be obtained from the response packet. In one or more embodiments, the second timestamp is generated based on one of the following points in time: (iii) the point in time in which the original response packet is obtained by the data plane, or (iv) the point in time in which the replicated request packet is obtained from the data plane by the analysis module. The second timestamp may be generated by the data plane during the mirroring of the response packet and provided to the analysis module. In such embodiments, the second timestamp is associated with the third (iii) point in time. Alternatively, the second timestamp is generated by the analysis module after obtaining the replicated response packet. In such embodiments, the second timestamp is associated with the fourth (iv) point in time.

In one or more embodiments, the response packet is a response DNS packet. The response DNS packet may include the results to queries of the request DNS packet as processed by a DNS server of the other network device. The response packet may further include the second timestamp.

In step 208, a portion of the response packet is extracted to obtain extracted response information. In one or more embodiments, the extracted response information includes one or more response codes corresponding to the servicing of the queries of the response packet and an IP address of the network device from which the response packet is obtained.

In one or more embodiments, if the response packet is a response DNS packet, the extracted response information further includes an IP address of the DNS server and a list of the response codes generated by the DNS server to respond to the request DNS packet. The extracted response information may further include the second timestamp corresponding to a point in time in which the response packet is obtained from either the data plane or from DNS server.

In step 210, the extracted request information and the extracted response information are processed to obtain processed information. In one or more embodiments, the extracted request information and the extracted response information (collectively referred to as the extracted information) is processed by performing calculations using values included in the extracted information. For example, the processed information may include a roundtrip time calculated using a difference between the second timestamp and the first timestamp. As a second example, the processed information may include a data structure that includes the list of queries and the corresponding response codes and/or whether an error response code is generated for a query. In another example, the processed information includes information about any DNS zone transfer requests serviced by the DNS server, a list of IP addresses associated with any secondary DNS servers involved in the DNS zone transfers, and whether communication was performed with the secondary DNS servers to service the request DNS packet.

In one or more embodiments, the processed information is a reformatted version of the extracted information. For example, the extracted information may be formatted in such a way that the extracted information may be provided to the monitoring system via an IP flow information export (IPFIX) protocol. The IPFIX protocol may require any information provided to the monitoring system to be in a particular format. The extracted information may be processed by formatting the extracted information in the particular format, resulting in the processed information. In such embodiments, the edge network device may utilize collectors (which may be internal or external to the monitoring system) to process the extracted information.

In step 212, the processed information is transmitted to a monitoring system of the network. In one embodiment, the processed information is transmitted as it is generated (or close in time to when it is generated by the edge device).

In another embodiment, the transmission of the processed information between the edge network device and the monitoring system may include implementing an active flow timeout. In such embodiments, the edge network device may transmit the processed information in predetermined active timeout intervals, and the processed information may be divided into portions, each of which is transmitted after a predetermined active timeout interval has elapsed.

In one or more embodiments, the processed information is used by the monitoring system to generate the aggregate processed information. The monitoring system may perform additional processing on the processed information generated in step 210 (and any additional processing information obtained from other edge network devices).

For example, the additional processing may include consulting a whitelist to determine whether any IP addresses (e.g., associated with the DNS servers) specified in the processed information are specified in the whitelist. If any IP addresses are not specified in the whitelist, a remediation may be performed. For example, the remediation may include updating state information to the edge network device that specifies rerouting any DNS request packets away from the identified DNS servers that are not specified in the whitelist. This may prevent the malicious servicing of request DNS packets and/or reduce any malicious servicing of DNS zone transfer requests.

Example

Figure 3:
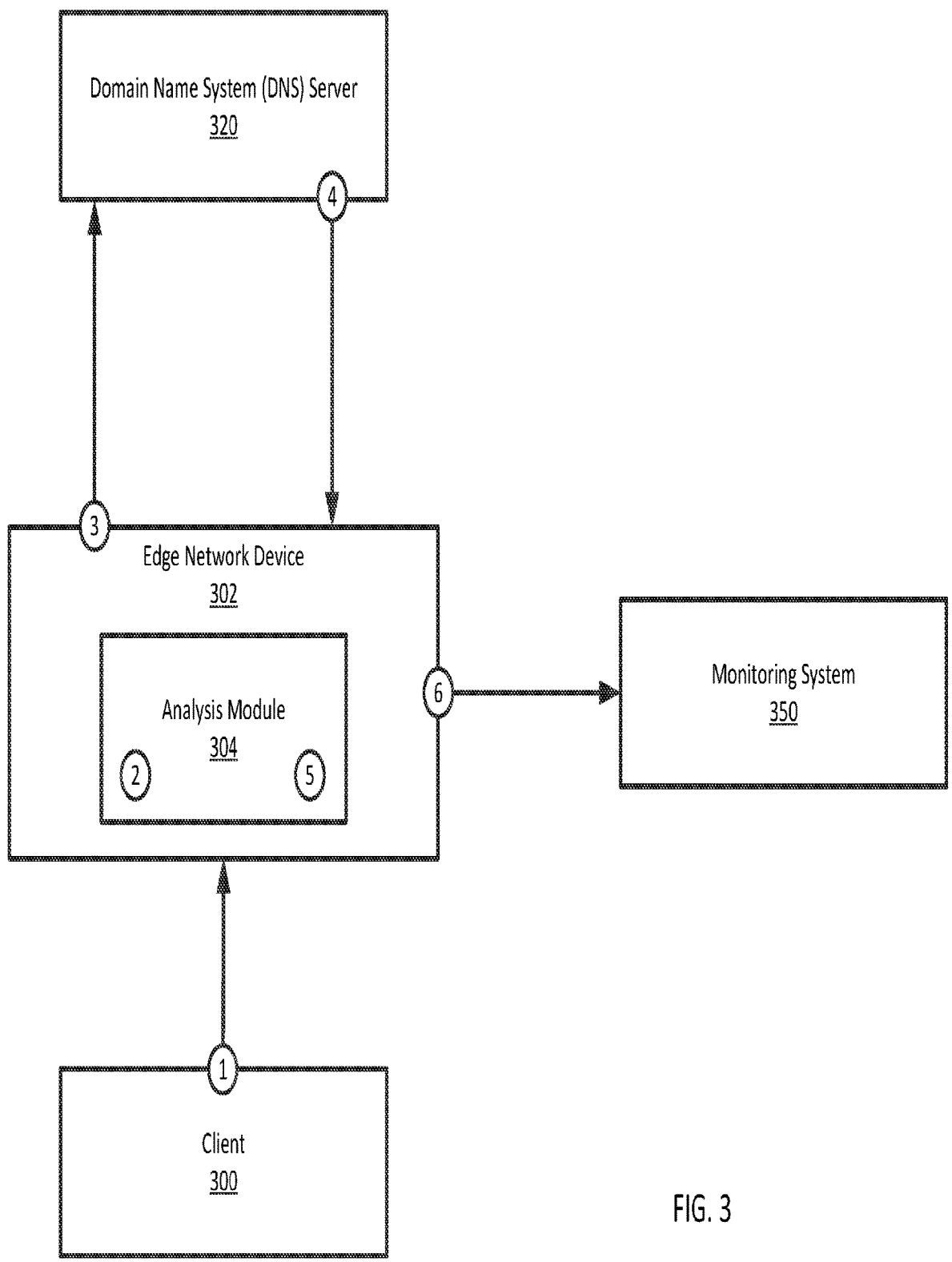
FIG. 3 shows an example in accordance with one or more embodiments.

FIG. 3 shows a diagram of an example in accordance with one or more embodiments disclosed herein. The example is not intended to limit the technology. Turning to the example, consider a scenario in which an edge network device is equipped to perform a processing of a pair of DNS packets.

A client (300) utilizes the edge network device (302) to access a web server (not shown). The client (300) sends a request DNS packet to the edge network device (302) that includes a query to access the web server using a domain name of the web server [1]. The edge network device (302) includes a data plane (not shown) that generates a replica of the request DNS packet and provides it to an analysis module (304). The analysis module (304) obtains extracted request information from the replica of the request DNS packet that includes the IP address of the client (300), a list of DNS queries in the request DNS packet, and a first timestamp generated by the analysis module and associated with a point in time in which the analysis module obtains the replica of the request DNS packet [2].

After obtaining the request DNS packet, the edge network device (302) transmits the request DNS packet to a DNS server (320) [3]. The DNS server (320) processes the request DNS packet by translating the domain name to an IP address of the web server. The DNS server (320) (which may be directly or indirectly connected to the edge network device (302)) generates a result associated with the translation and provides a response DNS packet to the edge network device (302) that includes the result [4]. After mirroring the response DNS packet to obtain a replica of the response DNS packet, the analysis module of the edge network device (302) extracts the extracted response information. The extracted response information includes a second timestamp generated by the analysis module and associated with a point in time in which the analysis module obtains the replica of the response DNS packet, a list of the response codes for each of the queries in the request DNS packet, and an IP address of the DNS server (320).

Using the extracted response information and the extracted request information, the analysis module (314) generates processed information [5]. The processed information includes a roundtrip time generated by calculating the difference between the second timestamp and the first timestamp. The processed information further includes a list of each query and whether the query type was: an address record, an IPv6 address records, a canonical name record in the query, a pointer to a resource record, or any other query type. Finally, the processed information further includes a list of queries that resulted in error codes. The processed information is provided to a monitoring system (350) [6]. The monitoring system (350), in response to the processed information, may perform additional processing using the processed information and any other processed information obtained from other edge network devices (not shown) to generate aggregate processed information. While not shown in this example, the aggregate processed information may be provided to an administrator of this system to manage the operation of the network.

End of Example

While the disclosure focuses on the monitoring pairs of DNS packets by edge device, embodiments of the disclosure may be extended to other request-response protocols that are implemented by network devices. For example, the pair of packets may be implemented using a dynamic host configuration protocol (DHCP), internet control message protocol (ICMP), address resolution protocol (ARP), unencrypted structured query language (SQL) query-response pairs, DNS over transport layer security (DoT), and DNS over hypertext transfer protocol secure (DoH).

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A network device, comprising:
   a processor;
   a non-transitory computer readable medium, comprising instructions for:
   extracting, at the network device, at least a portion of a request packet to obtain extracted request information;
   obtaining a response packet, wherein the response packet comprises a response to the request packet such that the request packet and response packet are a packet pair according to a network protocol;
   extracting, at the network device, at least a portion of the response packet to obtain extracted response information;
   determining packet pair information from the extracted request information and extracted response information; and
   transmitting the packet pair information to a monitoring system, without transmitting the packet pair to the monitoring system.

2. The network device of claim 1, wherein the extracted request information comprises a first timestamp generated by the network device.

3. The network device of claim 2, wherein the extracted request information comprises a time when a corresponding original request packet was obtained from a second network device or a time when the request packet is obtained.

4. The network device of claim 3, wherein the extracted response information comprises a second timestamp generated by the network device.

5. The network device of claim 4, wherein the extracted response information comprises a time when a corresponding original response packet was obtained, or a time in which the replicated response packet is obtained.

6. The network device of claim 1, wherein the packet pair information comprises a response time associated with a destination of the request packet.

7. The network device of claim 1, wherein the monitoring system aggregates mirrored packet information from multiple network devices.

8. A method for analyzing packets, the method comprising:
   obtaining a request packet from a client at a network device, the request packet intended for a destination;
   extracting, by the network device, at least a portion of the request packet to obtain extracted request information;
   obtaining a response packet at the network device wherein the response packet is associated with a response to the request packet such that the request packet and response packet are a packet pair according to a network protocol;
   extracting, at the network device, at least a portion of the response packet to obtain extracted response information;
   processing the extracted request information and the extracted response information to determine packet pair information; and
   transmitting the packet pair information to a monitoring system.

9. The method of claim 8, wherein the packet pair are domain name system (DNS) packets, dynamic host configuration protocol (DHCP) packets, internet control message protocol (ICMP) packets, address resolution protocol (ARP) packets, unencrypted structured query language (SQL) query-response packets, DNS over transport layer security (DoT) packets, or DNS over hypertext transfer protocol secure (DoH) packets.

10. The method of claim 9, wherein the request packet and the response packet are replicated in a control plane of the network device from corresponding packets in a data plane of the network device.

11. The method of claim 10, wherein the corresponding packets in the data plane are processed in accordance with the network protocol in the data plane of the network.

12. The method of claim 8, wherein the packet pair information comprises extracted request information or extracted response information formatted according to the IP flow information export (IPFIX) protocol.

13. The method of claim 8, wherein the packet pair information is transmitted to the monitoring system according to an active timeout interval.

14. The method of claim 13, wherein the packet pair information is divided into portions and each portion of packet pair information is transmitted according to the active timeout interval.

15. A non-transitory computer readable medium, comprising instructions for:
   obtaining a request packet from a client;
   extracting, by an network device, at least a portion of the request packet to obtain extracted request information;
   obtaining a response packet, wherein the response packet is received in response to the request packet such that the request packet and the response packet comprise a packet pair;
   extracting at least a portion of the response packet to obtain extracted response information;
   after the obtaining, determining packet pair information the extracted request information and the extracted response information to obtain processed information; and
   transmitting the processed information to a monitoring system.

16. The non-transitory computer readable medium of claim 15, wherein the extracted response information comprises at least one of: a DNS server IP address, a response code for the response DNS packet.

17. The non-transitory computer readable medium of claim 15, wherein the extracted request information comprises at least one of: a list of queries, a client device IP address and a list of IP addresses associated with a domain.

18. The non-transitory computer readable medium of claim 17, wherein the packet pair information comprises at least one of: a list of response codes each corresponding to one of the queries in the list of queries, a type identifier for each query in the list of queries and a list of error response codes in the response packet.

19. The non-transitory computer readable medium of claim 15, wherein the request packet is obtained from a data plane of the network device.

20. The non-transitory computer readable medium of claim 19, wherein an analysis module operating on a control plane of the network device obtains the extracted request information and the extracted response information.

* * * * *